US012609773B2

(12) United States Patent
Zhao et al.

(10) Patent No.: US 12,609,773 B2
(45) Date of Patent: Apr. 21, 2026

(54) QUANTUM CHANNEL SELECTION BASED ON NOISE MODELS

(71) Applicant: Cisco Technology, Inc., San Jose, CA (US)

(72) Inventors: Jiapeng Zhao, Kenmore, WA (US); Eneet Kaur, Somerville, MA (US); Luca Della Chiesa, Cesenatico (IT); Michael John Kilzer, Los Angeles, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 79 days.

(21) Appl. No.: 18/794,343

(22) Filed: Aug. 5, 2024

(65) Prior Publication Data

US 2026/0039396 A1 Feb. 5, 2026

(51) Int. Cl.
*H04L 9/08* (2006.01)
*G06N 10/60* (2022.01)
*H04B 10/70* (2013.01)

(52) U.S. Cl.
CPC ............. *H04B 10/70* (2013.01); *G06N 10/60* (2022.01); *H04L 9/0852* (2013.01)

(58) Field of Classification Search
CPC ....... H04B 10/70; G06N 10/60; H04L 9/0852
See application file for complete search history.

(56) References Cited

U.S. PATENT DOCUMENTS

| | | | | |
|---|---|---|---|---|
| 2020/0099520 | A1 | 3/2020 | Legré et al. | |
| 2020/0285947 | A1 | 9/2020 | Gunnels et al. | |
| 2021/0279624 | A1* | 9/2021 | Oliver .................... | G06N 10/40 |
| 2022/0067253 | A1* | 3/2022 | Chen ...................... | G06N 10/00 |
| 2023/0078794 | A1 | 3/2023 | Rahman | |
| 2024/0338466 | A1* | 10/2024 | Scarcelli ............... | H04B 10/70 |

FOREIGN PATENT DOCUMENTS

| | | |
|---|---|---|
| CN | 110601826 A | 12/2019 |
| CN | 116170135 A | 5/2023 |

OTHER PUBLICATIONS

CCSDS: "Variable Coded Modulation Protocol", CCSDS 431.1-B-1, Blue Book, Feb. 2021, Retrieved from https://public.ccsds.org/Pubs/431x0b1c1.pdf, 37 Pages.
Mao Y., et al., "Integrating Quantum Key Distribution with Classical Communications in Backbone Fiber Network", Optics Express, Research Article, Mar. 5, 2018, vol. 26, No. 5, Published on Feb. 27, 2018, 11 Pages.

(Continued)

*Primary Examiner* — Baotran N To
(74) *Attorney, Agent, or Firm* — Edell, Shapiro & Finnan, LLC

(57) ABSTRACT
The techniques described herein relate to a method including: generating a plurality of noise spectra, using a plurality of noise models, of noise generated in an optical channel by classical communication signals provided via the optical channel; generating a combined noise spectrum by combining the plurality of noise spectra; determining a quantum channel parameter for a quantum signal based upon the comprehensive noise spectrum; and providing the quantum signal over the optical channel using the quantum channel parameter.

20 Claims, 7 Drawing Sheets

400

GENERATING A PLURALITY OF NOISE SPECTRA, USING A PLURALITY OF NOISE MODELS, OF NOISE GENERATED IN AN OPTICAL CHANNEL BY CLASSICAL COMMUNICATION SIGNALS PROVIDED VIA THE OPTICAL CHANNEL — 410

GENERATING A COMBINED NOISE SPECTRUM BY COMBINING THE PLURALITY OF NOISE SPECTRA — 420

DETERMINING A QUANTUM CHANNEL PARAMETER FOR A QUANTUM SIGNAL BASED UPON THE COMBINED NOISE SPECTRUM — 430

PROVIDING THE QUANTUM SIGNAL OVER THE OPTICAL CHANNEL USING THE QUANTUM CHANNEL PARAMETER — 440

(56) References Cited

OTHER PUBLICATIONS

Thomas J.M., et al., "Designing Noise-Robust Quantum Networks Coexisting in the Classical Fiber Infrastructure", arXiv:2304.09076v2 [quant-ph], Apr. 20, 2023, Retrieved from https://doi.org/10.48550/arXiv.2304.09076, pp. 1-8.

Tkacenko A., et al., "Variable Coded Modulation (VCM) Cognitive Radio Higher-Order Constellation Receiver Operation", IPN Progress Report 42-213, May 15, 2018, Retrieved https://ipnpr.jpl.nasa.gov/progress_report/42-213/42-213B.pdf, pp. 1-11.

Valivarthi R., et al., "Measurement-device-independent Quantum Key Distribution Coexisting with Classical Communication", Quantum Science and technology, vol. 4, No. 045002, Jul. 30, 2019, pp. 1-8.

Wang L-J., et al., "Long Distance Co-propagation of Quantum Key Distribution and Terabit Classical Optical Data Channels", arXiv:1610.04475v1 [quant-ph], Oct. 14, 2016, pp. 1-8.

Wang L-J., et al., "Long-distance Copropagation of Quantum Key Distribution and Terabit Classical Optical Data Channels", Physical Review A 95, 012301, Jan. 3, 2017, pp. 1-8.

Wikipedia: "Proximity-1 Space Link Protocol", Last edited on Nov. 27, 2020, Retrieved from https://en.wikipedia.org/wiki/Proximity-1_Space_Link_Protocol on Jul. 26, 2024, 1 Page.

Xie H., et al., "Flight Test and Validation of Variable Coded Modulation Using SCaN Testbed", IPN Progress Report 42-212, Feb. 15, 2018, Retrieved from https://ipnpr.jpl.nasa.gov/progress_report/42-212/42-212B.pdf, pp. 1-23.

Zhong H., et al., "Continuous-variable Quantum Key Distribution Coexisting with Classical Signals on Few-mode Fiber", Optics Express, Research Article, May 10, 2021, vol. 29, No. 10, Published on Apr. 28, 2021, pp. 14486-14504.

* cited by examiner

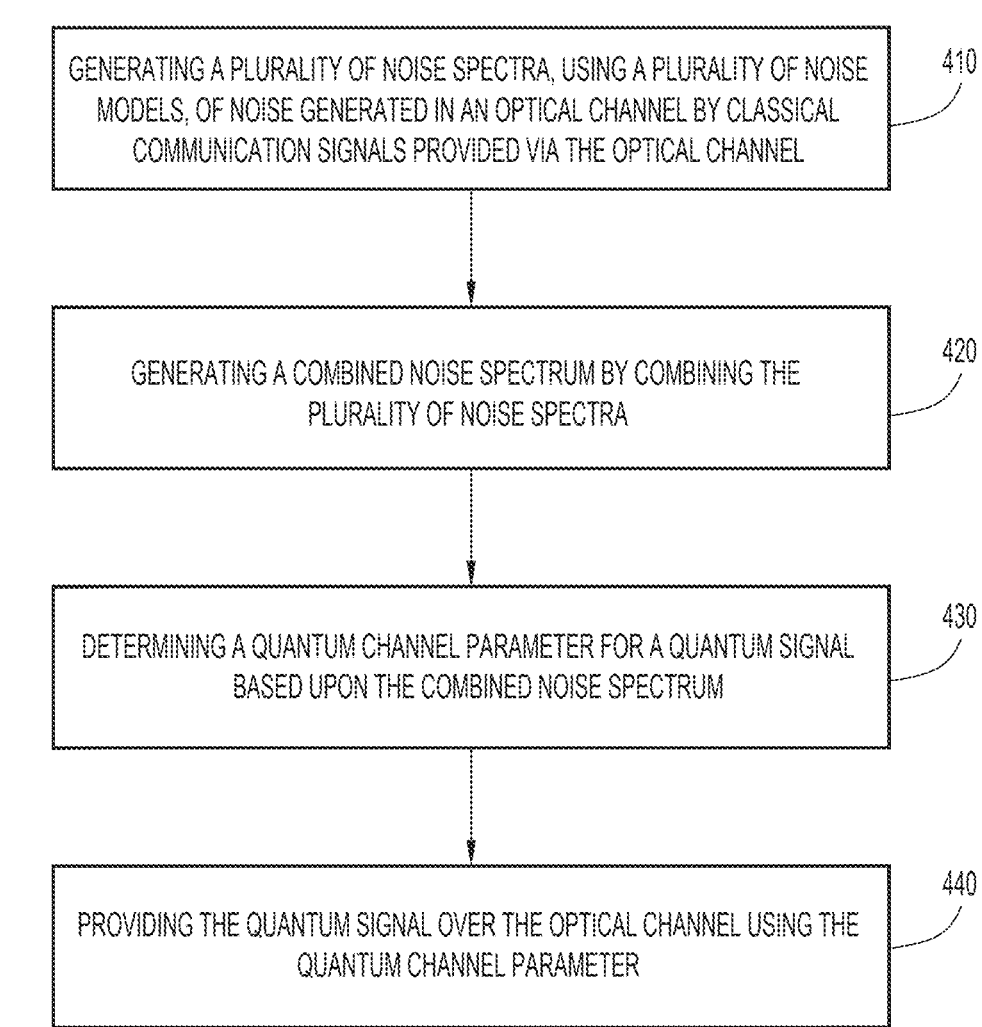

400

GENERATING A PLURALITY OF NOISE SPECTRA, USING A PLURALITY OF NOISE MODELS, OF NOISE GENERATED IN AN OPTICAL CHANNEL BY CLASSICAL COMMUNICATION SIGNALS PROVIDED VIA THE OPTICAL CHANNEL — 410

GENERATING A COMBINED NOISE SPECTRUM BY COMBINING THE PLURALITY OF NOISE SPECTRA — 420

DETERMINING A QUANTUM CHANNEL PARAMETER FOR A QUANTUM SIGNAL BASED UPON THE COMBINED NOISE SPECTRUM — 430

PROVIDING THE QUANTUM SIGNAL OVER THE OPTICAL CHANNEL USING THE QUANTUM CHANNEL PARAMETER — 440

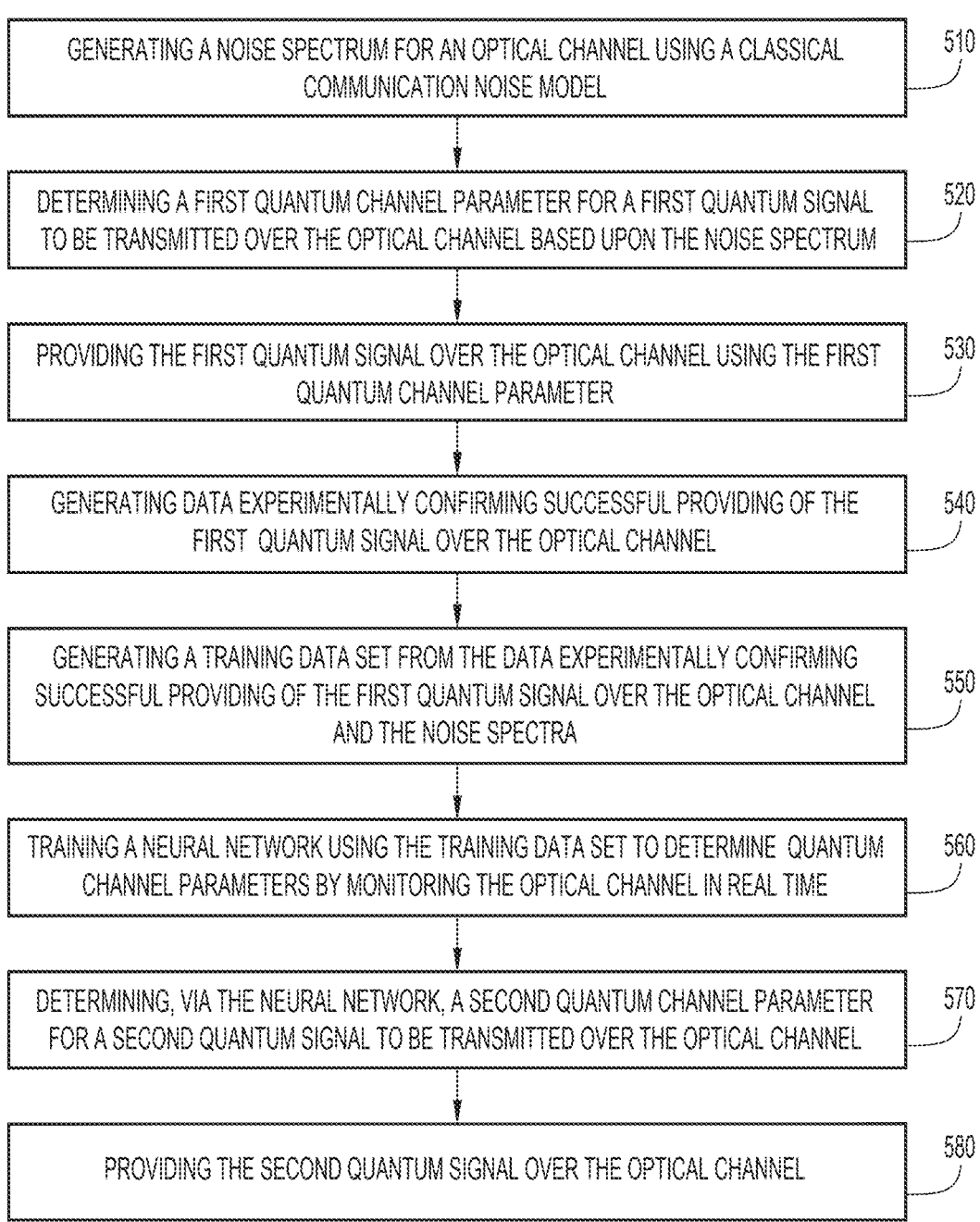

GENERATING A NOISE SPECTRUM FOR AN OPTICAL CHANNEL USING A CLASSICAL COMMUNICATION NOISE MODEL — 510

DETERMINING A FIRST QUANTUM CHANNEL PARAMETER FOR A FIRST QUANTUM SIGNAL TO BE TRANSMITTED OVER THE OPTICAL CHANNEL BASED UPON THE NOISE SPECTRUM — 520

PROVIDING THE FIRST QUANTUM SIGNAL OVER THE OPTICAL CHANNEL USING THE FIRST QUANTUM CHANNEL PARAMETER — 530

GENERATING DATA EXPERIMENTALLY CONFIRMING SUCCESSFUL PROVIDING OF THE FIRST QUANTUM SIGNAL OVER THE OPTICAL CHANNEL — 540

GENERATING A TRAINING DATA SET FROM THE DATA EXPERIMENTALLY CONFIRMING SUCCESSFUL PROVIDING OF THE FIRST QUANTUM SIGNAL OVER THE OPTICAL CHANNEL AND THE NOISE SPECTRA — 550

TRAINING A NEURAL NETWORK USING THE TRAINING DATA SET TO DETERMINE QUANTUM CHANNEL PARAMETERS BY MONITORING THE OPTICAL CHANNEL IN REAL TIME — 560

DETERMINING, VIA THE NEURAL NETWORK, A SECOND QUANTUM CHANNEL PARAMETER FOR A SECOND QUANTUM SIGNAL TO BE TRANSMITTED OVER THE OPTICAL CHANNEL — 570

PROVIDING THE SECOND QUANTUM SIGNAL OVER THE OPTICAL CHANNEL — 580

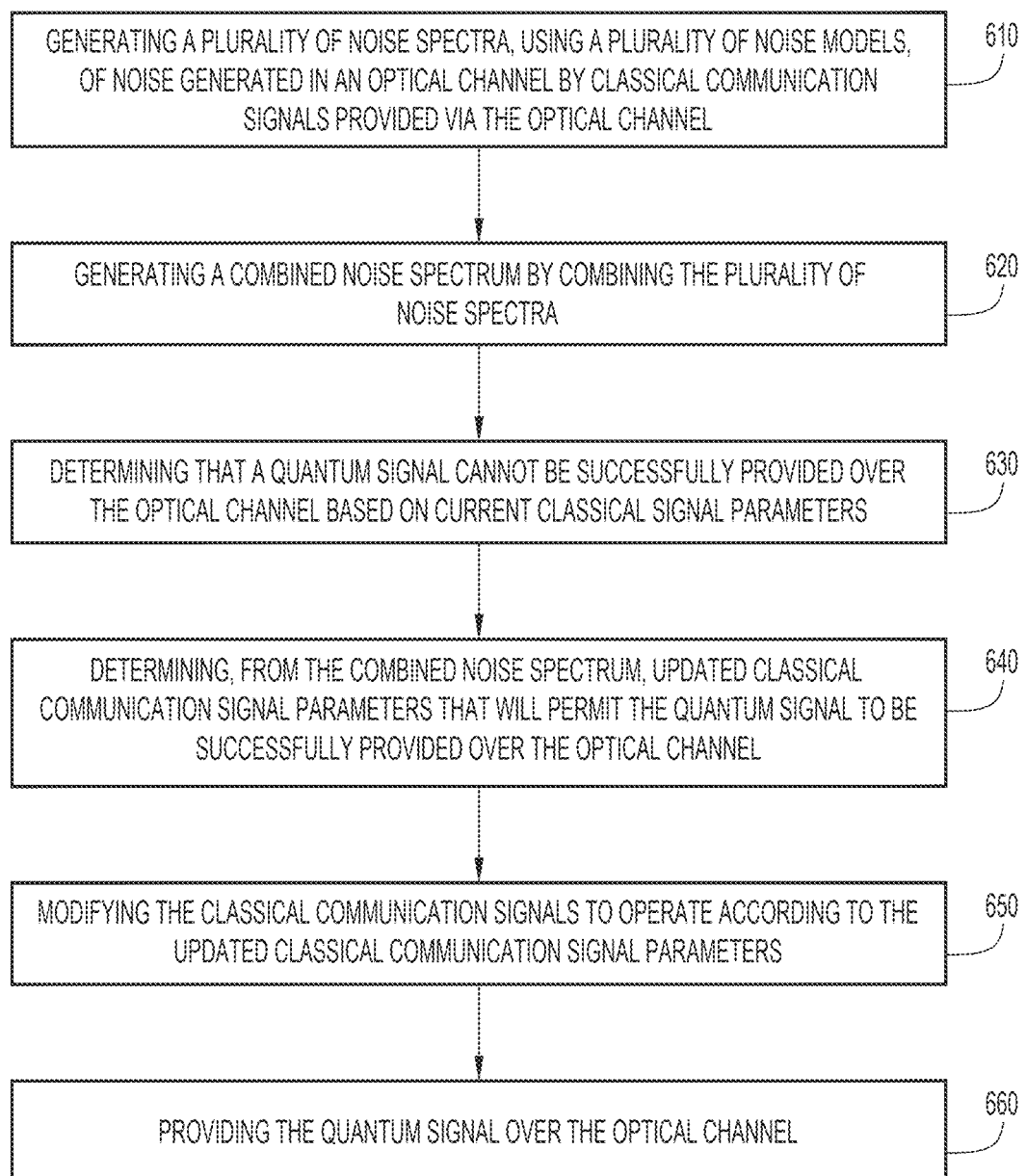

GENERATING A PLURALITY OF NOISE SPECTRA, USING A PLURALITY OF NOISE MODELS, OF NOISE GENERATED IN AN OPTICAL CHANNEL BY CLASSICAL COMMUNICATION SIGNALS PROVIDED VIA THE OPTICAL CHANNEL — 610

GENERATING A COMBINED NOISE SPECTRUM BY COMBINING THE PLURALITY OF NOISE SPECTRA — 620

DETERMINING THAT A QUANTUM SIGNAL CANNOT BE SUCCESSFULLY PROVIDED OVER THE OPTICAL CHANNEL BASED ON CURRENT CLASSICAL SIGNAL PARAMETERS — 630

DETERMINING, FROM THE COMBINED NOISE SPECTRUM, UPDATED CLASSICAL COMMUNICATION SIGNAL PARAMETERS THAT WILL PERMIT THE QUANTUM SIGNAL TO BE SUCCESSFULLY PROVIDED OVER THE OPTICAL CHANNEL — 640

MODIFYING THE CLASSICAL COMMUNICATION SIGNALS TO OPERATE ACCORDING TO THE UPDATED CLASSICAL COMMUNICATION SIGNAL PARAMETERS — 650

PROVIDING THE QUANTUM SIGNAL OVER THE OPTICAL CHANNEL — 660

FIG.6

CONTROL LOGIC 720

I/O 714

I/O

NETWORK PROCESSOR UNIT(s) 710

I/O 712

STORAGE 706

MEMORY ELEMENT(s) 704

708

PROCESSOR(s) 702

700

QUANTUM CHANNEL SELECTION BASED ON NOISE MODELS

TECHNICAL FIELD

The present disclosure relates to quantum network channel selection.

BACKGROUND

Quantum networks leverage classical optical infrastructure to enable the distribution of quantum information over long distances. While quantum communication offers unprecedented security advantages, transmitting quantum signals (e.g., qubits) over long distances without losing their quantum properties poses significant challenges.

Classical optical infrastructure may be leveraged to provide the backbone of quantum networks, providing the means to transmit quantum information over long distances, synchronize operations, and control various components. By leveraging existing optical infrastructure, quantum networks can build upon the robustness and scalability of classical communication systems while harnessing the unique capabilities of quantum mechanics for secure and efficient communication. Unfortunately, the co-existence of classical and quantum signals in the same optical fiber is challenging due to the strong noise induced by classical signals.

BRIEF DESCRIPTION OF THE DRAWINGS

FIG. 4 is a flowchart illustrating a process flow for implementing the quantum channel selection techniques disclosed herein, according to an example embodiment.

FIG. 5 is a flowchart illustrating a process flow for training a neural network to implement the quantum channel selection techniques disclosed herein, according to an example embodiment.

FIG. 6 is a flowchart illustrating a process flow for modifying classical signal parameters according to the quantum channel selection techniques disclosed herein, according to an example embodiment.

DETAILED DESCRIPTION

Overview

In some aspects, the techniques described herein relate to a method including: generating a plurality of noise spectra, using a plurality of noise models, of noise generated in an optical channel by classical communication signals provided via the optical channel; generating a combined noise spectrum by combining the plurality of noise spectra; determining a quantum channel parameter for a quantum signal based upon the combined noise spectrum; and providing the quantum signal over the optical channel using the quantum channel parameter.

In some aspects, the techniques described herein relate to a method including: generating a noise spectrum for an optical channel using a classical communication noise model; determining a first quantum channel parameter for a first quantum signal to be transmitted over the optical channel based upon the noise spectrum; providing the first quantum signal over the optical channel using the first quantum channel parameter; generating data experimentally confirming successful providing of the first quantum signal over the optical channel; generating a training data set from the data experimentally confirming successful providing of the first quantum signal over the optical channel and the noise spectrum; training a neural network using the training data set to determine quantum channel parameters by monitoring the optical channel in real time; determining, via the neural network, a second quantum channel parameter for a second quantum signal to be transmitted over the optical channel; and providing the second quantum signal over the optical channel. According to examples of the disclosed techniques, the neural network is embodied as a physics-informed neural network.

In some aspects, the techniques described herein relate to an apparatus including: one or more optical network interfaces configured to provide optical signals via one or more optical channels; and one or more processors configured to perform operations including: generating a plurality of noise spectra, using a plurality of noise models, of noise generated in an optical channel of the one or more optical channels by classical communication signals provided via the optical channel; generating a combined noise spectrum by combining the plurality of noise spectra; determining a quantum channel parameter for a quantum signal based upon the combined noise spectrum; and providing, via the one or more optical network interfaces, the quantum signal over the optical channel using the quantum channel parameter.

Example Embodiments

Figure 1:
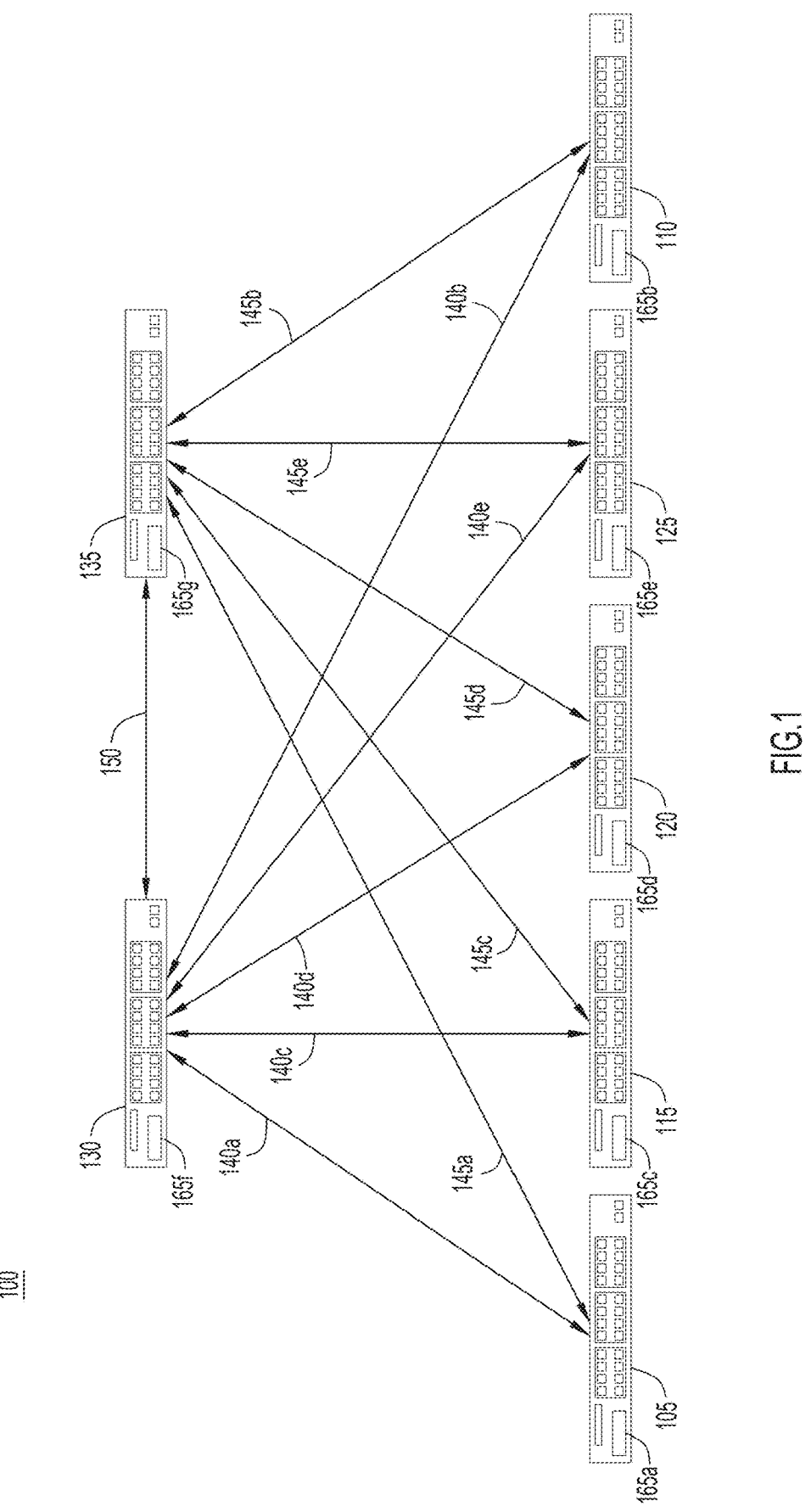
FIG. 1 illustrates a network environment in which classical and quantum communication signals coexist in the same optical links, according to an example embodiment.

With reference made to FIG. 1, depicted therein is a network 100 configured as a spine and leaf network, though the disclosed techniques are not limited to this network arrangement. Network 100 includes leaf switches 105, 110, 115, 120 and 125, and spine switches 130 and 135. According to the specific example of FIG. 1, leaf switches 105 and 110 are quantum switches as they are used to obtain and provide quantum signals to and from quantum devices. Leaf switches 115, 120 and 125 are classical switches as they are used to obtain and provide classical signals to and from classical devices. Interconnecting the spine and leaf switches of network 100 are network links 140*a*, 140*b*, 140*c*, 140*d*, 140*c*, 145*a*, 145*b*, 145*c*, 145*d*, 145*e* and 150. According to the example of FIG. 1, network links 140*a-e* are optical network links connecting spine switch 130 to leaf switches 105, 110, 115, 120 and 125, respectively. Network links 145*a-e* are optical links connecting spine switch 135 to leaf switches 105, 110, 115, 120 and 125, respectively. Network link 150 is an optical network link that connects spine switch 130 to spine switch 135.

The optical fibers that are used in the constructions of network links 140*a-e*, 145*a-e* and 150 may be configured to support telecommunication optical wavelengths and techniques, such as Wave Division Multiplexing (WDM) communications centered at wavelengths of 1550 nm. According to more specific examples, the communication links may provide for a Full Scale Range (FSR) of 100 GHz, 0-2 dbm for each channel, and include around 40-50 channels in a network link.

Network links 140a-c, 145a-c and 150 may be used to interconnect quantum leaf switches 105 and 110, but may be embodied as pre-existing classical infrastructure that are also used to provide and obtain classical communication signals in network 100. As described in detail below, the techniques disclosed herein, when implemented in network 100, provide for the selection of quantum and classical communication channel parameters that allow for quantum and classical communication signals to coexist in network links 140a-e, 145a-c and 150. Accordingly, switches 105, 110, 115, 120, 125, 130 and 135 are configured with quantum channel selection units 165a, 165b, 165c, 165d, 165c, 165f and 165g, respectively, configured to implement the techniques disclosed herein.

Figure 2:
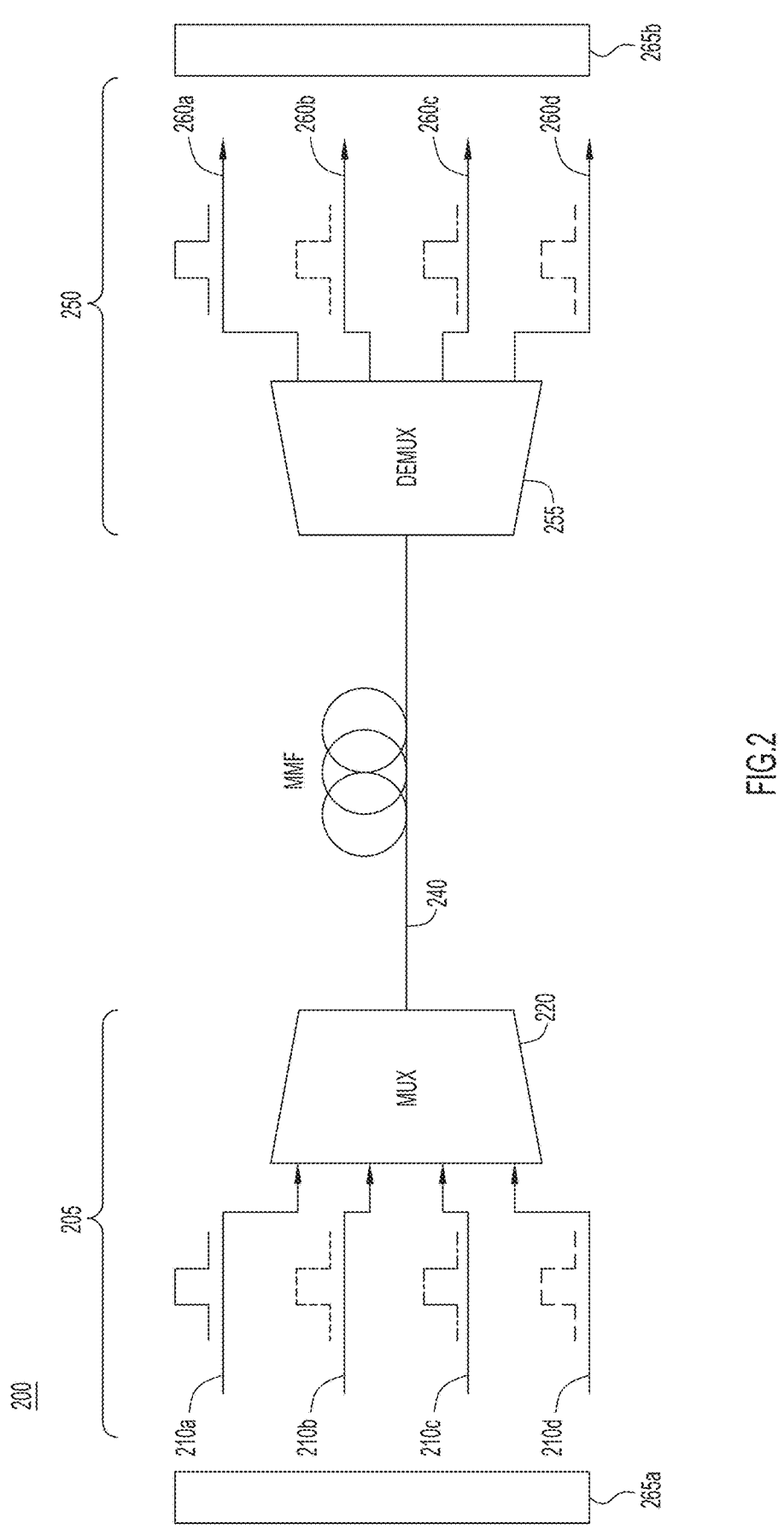
FIG. 2 illustrates an optical channel in which classical and quantum communication signals coexist, according to an example embodiment.

Turning to FIG. 2, illustrated there is a WDM optical channel 200 that may be implemented in one or more of network links 140a-c, 145a-e and 150. At the provide or transmit side 205, multiple optical signals 210a, 210b, 210c and 210d of different wavelengths are multiplexed by a wavelength multiplexer (MUX) 220. The multiplexed signals are then provided over an optical fiber 240. At the obtain or receive side 250, the signals are de-multiplexed by a wavelength de-multiplexer (DEMUX) 255 as optical signals 260a, 260b, 260c, and 260d. The wavelengths associated with optical signals 210a-d and 260a-d may be contained within a plurality of wavelengths bands, such as the O-band (1260-1360 nm), the E-band (1360-1460 nm), the S-band (1460-1530 nm), the C-band (1530-1565 nm), and the L-band (1565-1625 nm). Optical fibers generally have low loss in the bandwidth covered by these five bands. Accordingly, optical fiber 240 may be configured to support optical signals in a plurality of these bands.

Because optical fibers, such as optical fiber 240 of FIG. 2, are capable of supporting a wide range of wavelengths and a large number of optical channels, it may be possible to have quantum signals and classical signals coexisting in the same optical fiber. For example, classical communications within a specific channel may be limited to a particular wavelength band for a particular application, leaving the other bands available for use by quantum applications. Within each band, typically only a small number of the channels are used for communication and the remaining channels are reserved for redundancy. For example, if a particular classical communication application is utilizing the C-or L-bands, the O-band may be available for use by quantum applications. Furthermore, using dark links (i.e., quantum specific communication links, referred to as "dark" due to the low signal strengths associated with quantum signals) for quantum communication may be prohibitively expensive for certain applications. Accordingly, optical signals 210a-d and 260a-d may comprise quantum and classical signals coexisting in the same fiber 240 of optical channel 200. The techniques disclosed herein, when implemented in channel 200, provide for the selection of quantum and classical communication channel parameters, including the wavelengths of optical signals 210a-d and 260a-d, that allow for the quantum and classical communication signals to coexist in channel 200. To implement the disclosed techniques in optical channel 200, provide side 205 is configured with a quantum channel selection unit 265a configured to implement the techniques disclosed herein. Similarly, obtain side 250 is provided with quantum channel selection unit 265b.

Figure 3:
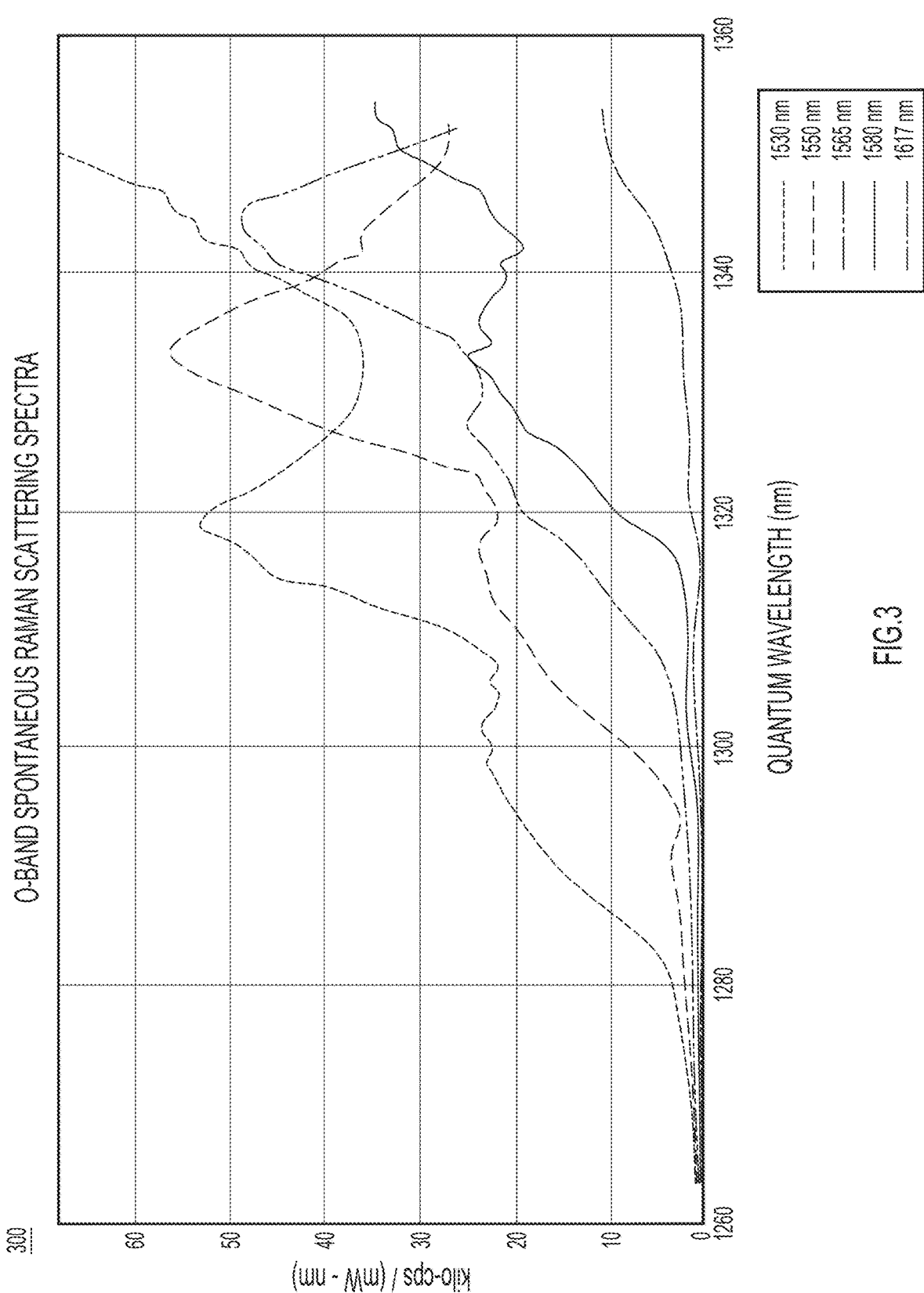
FIG. 3 is a noise spectra plot generated according to the quantum channel selection techniques disclosed herein, according to an example embodiment.

Classical channel communications that coexist with the quantum signals may provide sources of noise which degrade or overwhelm the quantum signals at the wavelengths used by the quantum signals. For example, illustrated in FIG. 3 is a plot 300 of spontaneous Raman scattering spectra in the O-Band telecommunication band caused by classical communications provided in the C- and L-Bands. As illustrated in spectra plot 300, Raman scattering caused by C- and L-Band classical communications are likely to overwhelm O-Band quantum communications with wavelengths greater than 1280 nm. In addition to Raman scattering, other sources of optical channel noise include:

Polarization mode dispersion;
Spectral broadening from self-phase modulation (SPM);
Kerr effect induced cross-phase modulation (XPM);
Four-wave mixing (FWM); and/or
Amplification spontaneous emission noise (ASE), among others.

The nonlinear sources of noise (e.g., SPM, FWM, XPM) may be induced either by classical to classical interference, or classical to quantum interference. Usually the noise induced by classical to classical interference is intensity noise, i.e., adding incoherent noise photons to the quantum signal. The noise induced by classical to quantum interference is mainly embodied as phase shifting noise.

Most of the above-described sources of noise in network channels have mature models that allow for predictions of the noise if the signals existing within the optical fiber are known, and the physics behind the models are mainly governed by the nonlinear Schrodinger equation. The techniques disclosed herein use classical channel noise models, such as WDM channel noise models, to generate a noise spectrum for each noise type. Adding the individual noise spectra together generates a combined noise spectrum for the entire channel. These individual noise spectra are generally incoherent. If a more complicated but more inclusive noise spectrum is desired, i.e., a combined spectrum including both the incoherent and coherent noise, solving the nonlinear Schrodinger equation may be performed, which is very complicated and models providing such spectra are generally unavailable. A noise spectrum that combines coherent and incoherent noise is referred to herein as a comprehensive noise spectrum.

The dynamics of optical fields, or the quantum state of photons, in an optical fiber is governed by the nonlinear Schrodinger equation. Many major fiber noise models can be found by solving the nonlinear Schrodinger equation. These noise spectra are often incoherent, meaning the spectra are independent to each other. Therefore, the disclosed techniques may estimate the noise spectra of each incoherent noise individually, and then combine the noise spectra to model incoherent noise sources. Optical fibers, however, may also exhibit coherent noise, which usually do not have analytical forms because the nonlinear Schrodinger equation that describes coherent noise is difficult to solve. For example, there may be too many possible coherent combinations of noises which cannot be solved by the nonlinear Schrodinger equation. Therefore, mature coherent noise models may not exist. Spectra that include coherent noise may be experimentally determined. The disclosed techniques include ways to predict comprehensive noise spectra, i.e., spectra that include both incoherent and coherent noise.

Based on the noise spectra and the desired quantum application, the disclosed techniques determine the best parameters for a quantum channel, including the wavelength and polarization to be used for the quantum signal, the degree of freedom for entanglement, the encoding protocol, and other parameters known to the skilled artisan. The metrics used for channel selection may vary from application to application, For example, in Quantum Key Distribution (QKD) applications, Quantum Bit Error Rate (QBER) should be minimized, while for entanglement distribution applications, the purity, fidelity or Bell inequality violation should be maximized.

The disclosed techniques may be applied at the network link level. For example, if a quantum signal is to be sent between two quantum switches, the disclosed techniques may be applied at each network link along a selected path between the quantum switches. Using network 100 of FIG. 1 as an example, for each network link between quantum switch 105 and quantum switch 110, the disclosed techniques may be implemented by quantum channel selection units 165*a-g* of FIG. 1 or quantum channel selection units 265*a* and 265*b* of FIG. 2 to select a channel for transmission between the links. Consider the spectra plot 300 of FIG. 3. As illustrated therein, substantial noise from classical signals provided in the C- and L-Bands would prevent transmission of quantum signals in the O-band, except for wavelengths at or below 1280 nm. By using classical models of the channel noise generated by classical signals in the C- and L-Bands, the techniques disclosed herein may select an appropriate wavelength in the O-Band for transmission of a quantum signal over a particular network link. In this case, such an appropriate wavelength would be 1280 nm or shorter.

The disclosed techniques may also be implemented at the network level. Specifically, the disclosed techniques may use classical channel noise estimation models to select the best path through a network, such as the best set of network links 140*a-e*, 145*a-e* and 150 of FIG. 1, to provide a quantum signal between quantum switch 105 and quantum switch 110. As illustrated in FIG. 1, quantum switch 105 is provided with two network links, network links 140*a* and 145*a*, and quantum switch 110 is provided with two network links 140*b* and 145*b*. Due to the sensitivity of quantum signals to noise, it may not be possible to choose the most direct path for the signal. For example, the two most direct paths between quantum switch 105 and quantum switch 110 would be either of two following paths:

Leaf Switch 105 à Link 140*a* à Spine Switch 130 àLink 140*b* à Leaf Switch 110; or Leaf Switch 105 à Link 145*a* à Spine Switch 135 à Link 145*b* à Leaf Switch 110.

Consider, however, a scenario in which all of the channels within network links 140*a* and 145*b* experience too much noise to successfully provide the quantum signal to quantum switch 110. This noise would foreclose either of the above-described direct paths from being used. The techniques disclosed herein may use classical channel noise models to model the noise throughout network 100 to determine the appropriate path through network 100 for the quantum signal.

With reference now made to FIG. 4, depicted therein is a flowchart 400 providing a process flow for implementing the disclosed techniques. Flowchart 400 begins in operation 410 in which a plurality of noise spectra are generated. The spectra indicate the noise generated in an optical channel by classical communication signals in the optical channel. The noise spectra are generated using a plurality of noise models. Examples of the spectra generated may include the wavelength specific Raman scattering noise spectra for the classical signals illustrated in plot 300 of FIG. 3.

Next, in operation 420, a combined noise spectrum is generated by combing the plurality of noise spectra. Accordingly, an example combined noise spectrum of operation 420 may be the combination the wavelength specific classical channel noise spectra illustrated in plot 300 of FIG. 3. The combined noise spectrum may also combine noise spectra plots for different types of noise. For example, the combined noise spectrum plot may combine Raman scattering noise spectra plots, polarization mode dispersion noise spectra plots, SPM noise spectra plots, XPM noise spectra plots, FWM noise spectra plots, and/or ASE noise spectra plots.

In operation 430, a quantum channel parameter is determined for a quantum signal from the combined noise spectrum. The quantum channel parameter may be one of numerous parameters known to the skilled artisan. Example parameters include the wavelength, polarization and/or photon number/intensity to be used for the quantum signal, a degree of freedom for entanglement of the quantum signal, or an encoding protocol for the quantum signal, among others. The parameter determined in operation 430 may be selected based on a metric required for an application associated with the quantum signal. For example, if the quantum signal is being used in a Quantum Key Distribution (QKD) application, the parameter may be determined in order to decrease or minimize the Quantum Bit Error Rate (QBER) of the quantum signal. On the other hand, if the quantum signal is being used to provide entanglement distribution, the parameter may be selected to maximize the quantum purity, i.e., the Bell inequality violation, of the quantum signal. Accordingly, the parameter may be chosen such that the QBER or quantum purity for the quantum signal has a value sufficient for successfully providing the quantum signal over the optical channel, for successfully implementing a particular application, and/or for successfully implementing a particular application with a predetermined success rate.

Using the noise spectra plot 300 of FIG. 3 as an example, operation 430 may select a wavelength of 1280 nm or less as the quantum channel parameter for an optical signal to be sent over an optical channel with noise spectra as illustrated in spectra plot 300 of FIG. 3. Using a wavelength higher than 1280 nm may result in the quantum signal being overwhelmed by the Raman scattering noise generated in the optical channel by the classical signals provided in the C- and L-Bands.

Finally, in operation 440, the optical signal is provided over the optical channel using the quantum channel parameter.

As noted above, the process flow illustrated in FIG. 4 may be carried out for a single optical channel, such as the optical channel illustrated in FIG. 2, or the process may be carried out multiple times for multiple communication links in order to determine channel parameters and network paths through a network for the quantum signal. For example, the process flow of flowchart 400 may be carried out for all or a subset of network links 140*a-e*, 145*a-c* and 150 of FIG. 1 so that a viable path through network 100 may be determined for an optical signal sent between quantum switch 105 and quantum switch 110. The operations of flowchart 400 may also be carried out using a neural network, including a physics-informed neural network, described in detail below.

What now follows is a description of how the generalized process flow of flowchart 400 can be applied to a specific quantum signal used for discrete variable QKD (DV-QKD), that will be provided by an optical channel that includes classical signals in the same optical fiber. In this DV-QKD example, noise photons from Raman scattering, amplification noise, FWM (classical to classical), XPM (classical to classical), SPM (classical to classical) exist in the optical channel. For simplicity, the following description addresses only the Raman scattering noise, which will be the greatest source of noise in the channel.

There are two major discrete variable DV-QKD encoding protocols—time-bin and polarization encoding. Spectral broadening from nonlinear noise may be critical for time-bin encoding but not polarization encoding as it is not very sensitive to spectral broadening. In contrast, polarization modal dispersion is important for polarization encoding but may not be critical for time-bin encoding. Accordingly, depending on the noise characteristics of the optical channel, it may be important to select between time-bin and polarization encoding.

In this example the classical signals in the optical channel are assumed to be in the C-Band, which results in the noise spectra plot 300 illustrated in FIG. 3. Summing the Raman noise from each classical channel in the C-Band shows that only in the lower wavelength region, from 1260 to 1280 nm, is the noise is small enough for quantum signals. Thus, the quantum channel is selected to be in this wavelength range. This would be the first channel parameter selected according to the disclosed techniques. Once the wavelength for the channel has been determined, the techniques may be repeated using other noise models to determine other channel parameters. For example, a polarization modal dispersion noise model and a spectral broadening noise model may be used to analyze the quantum bit error rate at these wavelength regimes. If the quantum bit error rate induced by the spectral broadening is higher than the noise induced by polarization modal dispersion, polarization encoding is more favorable and polarization encoding would be used for the quantum signal, and vice versa. The selection of the encoding protocol would be a second quantum channel parameter determined using the disclosed techniques.

Depending on the number of quantum parameters and channels, it may not be feasible to perform or repeat the operations of flowchart 400 for all quantum signals. Accordingly, the techniques of this disclosure may also be used to train a neural network to dynamically determine the parameters for quantum signals provided over optical links shared with classical signals.

Furthermore, as more classical channels are combined, coherent noise, which may be too complicated to determine through pre-existing models, may significantly contribute to channel noise. Thus, a combined noise spectrum generated from classical incoherent noise models may not be comprehensive at some phases. To model spectra that include both coherent and incoherent sources of noise, physics-informed neural networks (PINNs) may be used. A PINN is a supervised neural network whose training is guided by physical laws. PINNs may more efficiently and more accurately predict, for example, an optical channel noise spectrum because the implementation of physics equations into the loss function of the neural network filters out the non-physical results. Moreover, a PINN may be able to solve physics equations, such as nonlinear Schrodinger equations, that are very difficult to solve using other techniques. Implementing PINNs in the techniques disclosed herein may enable the disclosed techniques to predict coherent channel spectra noise when using incoherent noise models to train the PINN. Therefore, by using the PINN and the appropriate nonlinear Schrodinger equation, the disclosed techniques may be used to generate a comprehensive noise spectrum including both incoherent and coherent noise.

Flowchart 500 of FIG. 5 provides an example process flow for training neural networks used in the disclosed techniques, including PINNs.

Flowchart 500 begins in operation 510 in which a noise spectrum for an optical channel is generated using a classical communication noise model. Operation 510 may be analogous to operation 410 and/or operation 420 of flowchart 400 of FIG. 4. In operation 520, a first quantum channel parameter for a first quantum signal to be transmitted over the optical channel is determined based upon the noise spectrum. Accordingly, operation 520 may be analogous to operation 430 of FIG. 4. In operation 530, the quantum signal is provided over the optical channel using the quantum channel parameter. As illustrated through these first three operations of flowchart 500, the process flow begins in a manner similar to that of flowchart 400 of FIG. 4.

Flowchart 500 deviates from flowchart 400 in operation 540, in which data is generated that experimentally confirms successful providing of the quantum signal over the optical channel. Operation 540 may include using an optical channel monitor to determine the actual noise spectra for the optical channel and using a quantum detector to determine that the quantum signal was successfully provided over the optical channel. Operation 540 may include sweeping through the filters of the optical channel monitor to determine all of the relevant channel noise spectra.

Operations 510-540 may be repeated a number of times to acquire data for different optical channel situations, i.e., different classical channels sharing the optical channel with the quantum signal resulting in different noise spectra.

Once the experimental data is generated, it can be used to train a neural network to perform quantum channel parameter determinations. Accordingly, in operation 550, a training data set is generated from the data experimentally confirming successful providing of the quantum signal. For example, if the experimental data finds a mismatch between the noise spectra generated in operation 510 and the noise spectra experimentally determined in operation 540, the experimental data may replace the model generated data. If there is a mismatch between the model determined noise minimums and the experimental data minimums, the experimental data may replace the model-generated data. Operation 550 may also include performing quantum tomography, BER calculations and/or quantum purity calculations based on the selected optical parameter to verify the successful providing of the optical signal.

Next, in operation 560, a neural network is trained using the training data set to determine the quantum channel parameter by monitoring the optical channel in real time. Operation 560 may ensure that the training data meets the experimental observation.

Operation 560 may include the training of a PINN. In such examples, the PINN is trained using the training data set and the governing physics equations, such as the appropriate nonlinear Schrodinger equation, that characterize the optical channel. The use of the governing physics equations ensures the physical correctness of the training results to be accurate even for coherent noise for which analytical models do not exist.

Once the neural network is trained, it is used in operation 570 to determine optical channel parameters, and in operation 580, optical signals are provided over the optical channel using the optical channel parameters determined in operation 570.

As described above, the disclosed techniques include the selection of quantum parameters for a quantum signal. Accordingly, for a quantum signal sent between quantum switch 105 and quantum switch 110 as illustrated in FIG. 1, or a quantum signal sent through optical channel 200 of FIG. 2, the elements providing and obtaining the quantum signal need to be synchronized and understand which parameters are being used to provide the signal. In other words, the provider of the signal and the obtainer of the signal may need to synchronize their modulation/demodulation and encoding/decoding schemes, respectively. For example, quantum channel selection units 165*a-g* of FIG. 1 and/or quantum channel selection units 265*a* and 265*b* of FIG. 2 may be configured to synchronize quantum channel parameters as described below.

The synchronization of quantum channel parameters may include an initialization when an optical channel is established and subsequent synchronizations after the disclosed techniques are used to determined quantum channel parameters based on classical signal noise. When the optical channel is established, the provider and obtainer of the quantum signal may be initialized with the same settings for the optimal quantum channel parameters.

Once initialized, the provider of the quantum signal over the optical channel may determine the quantum channel parameters using the disclosed techniques. These parameters may be communicated to the obtainer of the quantum signal using the classical channel prior to the commencement of quantum communication. An acknowledgement over the classical channel would be used to confirm that the parameters have been received.

After initialization, and once a neural network is implemented to update the quantum channel parameters, the parameters determined by the neural network may be communicated between the provider and obtainer of the quantum signal as new parameters are determined. The updated parameters may be communicated in different ways. According to a first example, the provider of the quantum signal may communicate the updated quantum signal parameters at a regular time interval. This interval may be updated, i.e., shortened or increased, depending on the noise characteristics of the channel. These changes to the interval would also be communicated via the classical communication channel. According to other examples, asynchronous updating of the quantum signal parameters is used in which updated parameters are only communicated when they change. In both the regular time interval and dynamic cases, the obtainer of the new parameters provides an acknowledgement so that it is known that the new settings were successfully obtained. Only then would the new settings become the current settings at an agreed upon time. The use of an agreed upon time for implementing the new settings may be beneficial. For example, using such an agreed upon time may increase the efficiency and/or integrity of the signal transfer by allowing the provider and obtainer of the signal to continue communicating quantum signals using old parameters while the new parameters are exchanged and acknowledged.

The descriptions provided above essentially prioritize the classical signals in the optical channel over the quantum signals, i.e., the quantum channel parameters are selected in response to the noise spectra that results from the classical signals. Quantum signals are, however, very fragile. In many instances, it will not be possible to successfully provide a quantum signal over an optical channel in which classical signals coexist regardless of the parameters selected for the quantum signal. In such situations, the techniques of this disclosure may be used to select classical communication parameters to enable quantum communication, which is now reprioritized to a high level, with an acceptable decrease in classical channel capacity. The disclosed techniques may also be used to determine an acceptable decrease in classical channel capacity that will permit an increase to an intended number of quantum signals. In others words, the disclosed techniques may be used to select classical channel parameters and capacity that will allow for a specific quantum channel capacity.

Accordingly, illustrated in FIG. 6 is a flowchart 600 that provides a generalized process flow for modifying classical signal parameters according to the disclosed techniques. Flowchart 600 begins in a way that is analogous to the process flow of flowchart 400 of FIG. 4. Accordingly, in operation 610 a plurality of noise spectra are generated, and in operation 620, a combined noise spectrum is generated by combing the plurality of noise spectra. An example combined noise spectrum of operation 620 may be the combination of the classical channel noise spectra illustrated in plot 300 of FIG. 3.

Flowchart 600 differs from flowchart 400 in operation 630 where it is determined that a quantum signal cannot be successfully provided over the optical channel based on current classical signal parameters. Accordingly, in operation 640, updated classical communication signal parameters are determined from the combined noise spectrum that will permit the quantum signal to be successfully provided over the optical channel. In operation 650 the classical communication signals are modified to operate according to the updated classical communication signal parameters. Finally, in operation 660, the quantum signal is provided over the optical channel. A PINN, similar to those described above, may be trained to dynamically adjust the classical channels to accommodate quantum signals.

Figure 7:
FIG. 7 illustrates a hardware block diagram of a device configured to implement the quantum channel selection techniques disclosed herein, according to an example embodiment.

Referring to FIG. 7, FIG. 7 illustrates a hardware block diagram of a device 700 that may perform functions associated with operations discussed herein in connection with the techniques depicted in FIGS. 1-6. The device 700 may be a computer (laptop, desktop, etc.) or other device involved in video encoding/decoding operations, including video conference equipment, Smartphones, tablets, streaming servers, etc.

In at least one embodiment, the device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. I/O interfaces 712 and 714 may connect to the microphone, camera and display devices, including VR/AR headset described above. In various embodiments, instructions associated with logic for device 700 can overlap in any manner and are not limited to the specific allocation of instructions and/or operations described herein.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment. The hardware-based packet classification solution may be integrated into one or more ASICs that form a part or an entirety of the network processor unit(s) 710.

I/O interface(s) 714 allow for input and output of data and/or information with other entities that may be connected to device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, a VR/AR device, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, provided for herein are techniques to characterize the noise induced by classical communication on the wavelengths for quantum communication that will coexist in the same optical channel. The techniques model the prominent sources of noise from the classical communication on various wavelengths, intensities and polarizations. The techniques experimentally verify and correct the theoretical predictions. Neural networks, including PINNs, may be used to dynamically prediction the impact of noise on the wavelength selection and the encoding used in optical channels, such as the polarization and time bin of the signals, among other encodings. When PINNs are used, the dynamic predictions may include coherent noise predictions which has been traditionally difficult to predict. The use of PINNs provides for comprehensive noise spectra, i.e., spectra that include both coherent and incoherent noise sources, which ultimately allows for better quantum channel selection.

Accordingly, in some aspects, the techniques described herein relate to a method including: generating a plurality of noise spectra, using a plurality of noise models, of noise generated in an optical channel by classical communication signals provided via the optical channel; generating a combined noise spectrum by combining the plurality of noise spectra; determining a quantum channel parameter for a quantum signal based upon the combined noise spectrum; and providing the quantum signal over the optical channel using the quantum channel parameter.

In some aspects, the techniques described herein relate to a method, wherein the quantum channel parameter includes at least one of a wavelength, a polarization, a degree of freedom, or an encoding protocol for the quantum signal.

In some aspects, the techniques described herein relate to a method, wherein determining the quantum channel parameter includes determining the quantum channel parameter based upon a quantum bit error rate.

In some aspects, the techniques described herein relate to a method, wherein the quantum signal includes a quantum key distribution quantum signal.

In some aspects, the techniques described herein relate to a method, wherein determining the quantum channel parameter includes determining the quantum channel parameter based upon a quantum purity.

In some aspects, the techniques described herein relate to a method, wherein the quantum signal includes an entanglement distribution quantum signal.

In some aspects, the techniques described herein relate to a method, wherein: generating the plurality of noise spectra includes generating a respective noise spectrum for each of a plurality of network links in a network; generating the combined noise spectrum includes generating a respective combined noise spectrum for each of the plurality of network links; and determining the quantum channel parameter for the quantum signal includes determining a respective quantum channel parameter for each of the plurality of network links.

In some aspects, the techniques described herein relate to a method, further including determining a network path through the network based upon the respective combined noise spectrum.

In some aspects, the techniques described herein relate to a method, further including: generating data experimentally confirming successful providing of the quantum signal over the optical channel; generating a training data set from the data experimentally confirming successful providing of the quantum signal over the optical channel and at least one of the plurality of noise spectra or the combined noise spectrum; and training a neural network using the training data set to determine the quantum channel parameter by monitoring the optical channel in real time.

In some aspects, the techniques described herein relate to a method, wherein training the neural network includes training a physics-informed neural network.

In some aspects, the techniques described herein relate to a method, wherein generating the training data set includes generating the training data set from data providing a comprehensive noise spectrum.

In some aspects, the techniques described herein relate to a method, wherein generating the combined noise spectrum includes generating a comprehensive noise spectrum using a physics-informed neural network.

In some aspects, the techniques described herein relate to a method including: generating a noise spectrum for an optical channel using a classical communication noise model; determining a first quantum channel parameter for a first quantum signal to be transmitted over the optical channel based upon the noise spectrum; providing the first quantum signal over the optical channel using the first quantum channel parameter; generating data experimentally confirming successful providing of the first quantum signal over the optical channel; generating a training data set from the data experimentally confirming successful providing of the first quantum signal over the optical channel and the noise spectrum; training a neural network using the training data set to determine quantum channel parameters by monitoring the optical channel in real time; determining, via the neural network, a second quantum channel parameter for a second quantum signal to be transmitted over the optical channel; and providing the second quantum signal over the optical channel.

In some aspects, the techniques described herein relate to a method, wherein generating the data experimentally confirming successful providing of the first quantum signal over the optical channel includes performing a quantum bit error rate calculation on signals provided over the optical channel, performing quantum tomography on the optical channel, or determining quantum purity of a quantum signal provided over the optical channel.

In some aspects, the techniques described herein relate to a method, wherein training the neural network includes training a physics-informed neural network.

In some aspects, the techniques described herein relate to a method, wherein generating the training data set includes generating the training data set from data providing a comprehensive noise spectrum.

In some aspects, the techniques described herein relate to an apparatus including: one or more optical network interfaces configured to provide optical signals via one or more optical channels; and one or more processors configured to perform operations including: generating a plurality of noise spectra, using a plurality of noise models, of noise generated in an optical channel of the one or more optical channels by classical communication signals provided via the optical channel; generating a combined noise spectrum by combining the plurality of noise spectra; determining a quantum channel parameter for a quantum signal based upon the combined noise spectrum; and providing, via the one or more optical network interfaces, the quantum signal over the optical channel using the quantum channel parameter.

In some aspects, the techniques described herein relate to an apparatus, wherein the quantum channel parameter includes at least one of a wavelength, a polarization, a degree of freedom, or an encoding protocol for the quantum signal.

In some aspects, the techniques described herein relate to an apparatus, wherein the operation of determining the quantum channel parameter includes determining the quantum channel parameter based upon a quantum bit error rate.

In some aspects, the techniques described herein relate to an apparatus, wherein the operation of generating the combined noise spectrum includes generating a comprehensive noise spectrum using a physics-informed neural network.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
generating a plurality of noise spectra, using a plurality of noise models, of noise generated in an optical channel by classical communication signals provided via the optical channel;
generating a combined noise spectrum by combining the plurality of noise spectra;
determining a quantum channel parameter for a quantum signal based upon the combined noise spectrum; and
providing the quantum signal over the optical channel using the quantum channel parameter.

2. The method of claim 1, wherein the quantum channel parameter comprises a least one of a wavelength, a polarization, a degree of freedom, or an encoding protocol for the quantum signal.

3. The method of claim 1, wherein determining the quantum channel parameter comprises determining the quantum channel parameter based upon a quantum bit error rate.

4. The method of claim 3, wherein the quantum signal comprises a quantum key distribution quantum signal.

5. The method of claim 1, wherein determining the quantum channel parameter comprises determining the quantum channel parameter based upon a quantum purity.

6. The method of claim 5, wherein the quantum signal comprises an entanglement distribution quantum signal.

7. The method of claim 1, wherein:
generating the plurality of noise spectra comprises generating a respective noise spectrum for each of a plurality of network links in a network;
generating the combined noise spectrum comprises generating a respective combined noise spectrum for each of the plurality of network links; and determining the quantum channel parameter for the quantum signal comprises determining a respective quantum channel parameter for each of the plurality of network links.

8. The method of claim 7, further comprising determining a network path through the network based upon the respective combined noise spectrum.

9. The method of claim 1, further comprising:
generating data experimentally confirming successful providing of the quantum signal over the optical channel;
generating a training data set from the data experimentally confirming successful providing of the quantum signal over the optical channel and at least one of the plurality of noise spectra or the combined noise spectrum; and
training a neural network using the training data set to determine the quantum channel parameter by monitoring the optical channel in real time.

10. The method of claim 9, wherein training the neural network comprises training a physics-informed neural network.

11. The method of claim 10, wherein generating the training data set comprises generating the training data set from data providing a comprehensive noise spectrum.

12. The method of claim 1, wherein generating the combined noise spectrum comprises generating a comprehensive noise spectrum using a physics-informed neural network.

13. A method comprising:
generating a noise spectrum for an optical channel using a classical communication noise model;
determining a first quantum channel parameter for a first quantum signal to be transmitted over the optical channel based upon the noise spectrum;
providing the first quantum signal over the optical channel using the first quantum channel parameter;
generating data experimentally confirming successful providing of the first quantum signal over the optical channel;
generating a training data set from the data experimentally confirming successful providing of the first quantum signal over the optical channel and the noise spectrum;
training a neural network using the training data set to determine quantum channel parameters by monitoring the optical channel in real time;
determining, via the neural network, a second quantum channel parameter for a second quantum signal to be transmitted over the optical channel; and
providing the second quantum signal over the optical channel.

14. The method of claim 13, wherein generating the data experimentally confirming successful providing of the first quantum signal over the optical channel comprises performing a quantum bit error rate calculation on signals provided over the optical channel, performing quantum tomography on the optical channel, or determining quantum purity of a quantum signal provided over the optical channel.

15. The method of claim 13, wherein training the neural network comprises training a physics-informed neural network.

16. The method of claim 15, wherein generating the training data set comprises generating the training data set from data providing a comprehensive noise spectrum.

17. An apparatus comprising:
one or more optical network interfaces configured to provide optical signals via one or more optical channels; and one or more processors configured to perform operations comprising:

generating a plurality of noise spectra, using a plurality of noise models, of noise generated in an optical channel of the one or more optical channels by classical communication signals provided via the optical channel;

generating a combined noise spectrum by combining the plurality of noise spectra;

determining a quantum channel parameter for a quantum signal based upon the combined noise spectrum; and providing, via the one or more optical network interfaces, the quantum signal over the optical channel using the quantum channel parameter.

18. The apparatus of claim 17, wherein the quantum channel parameter comprises at least one of a wavelength, a polarization, a degree of freedom, or an encoding protocol for the quantum signal.

19. The apparatus of claim 17, wherein the operation of determining the quantum channel parameter comprises determining the quantum channel parameter based upon a quantum bit error rate.

20. The apparatus of claim 17, wherein the operation of generating the combined noise spectrum comprises generating a comprehensive noise spectrum using a physics-informed neural network.

* * * * *